US012399542B2

(12) United States Patent
Lee et al.

(10) Patent No.: US 12,399,542 B2
(45) Date of Patent: Aug. 26, 2025

(54) ELECTRONIC DEVICE AND CONTROL METHOD THEREFOR

(71) Applicant: SAMSUNG ELECTRONICS CO., LTD., Suwon-si (KR)

(72) Inventors: Sangmin Lee, Suwon-si (KR); Sungyong Bang, Suwon-si (KR); Jongwoo Kim, Suwon-si (KR); Hakryoul Kim, Suwon-si (KR); Mooyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 159 days.

(21) Appl. No.: 18/208,092

(22) Filed: Jun. 9, 2023

(65) Prior Publication Data

US 2023/0325293 A1    Oct. 12, 2023

Related U.S. Application Data

(63) Continuation of application No. PCT/KR2021/000747, filed on Jan. 19, 2021.

(30) Foreign Application Priority Data

Jan. 12, 2021   (KR) .................. 10-2021-0003804

(51) Int. Cl.
*G06F 1/20*         (2006.01)
*G06F 11/30*        (2006.01)

(52) U.S. Cl.
CPC .......... *G06F 1/206* (2013.01); *G06F 11/3058* (2013.01)

(58) Field of Classification Search
CPC .... G06F 1/206; G06F 11/3058; G06F 1/3206; G06F 11/30; G05D 23/19

(Continued)

(56) References Cited

U.S. PATENT DOCUMENTS 6,191,546 B1 *  2/2001  Bausch .............. H05K 7/20209
                                                              388/934
6,557,072 B2    4/2003  Osborn
(Continued)

FOREIGN PATENT DOCUMENTS

JP          5905471 B2     4/2016
JP       2020-54179 A      4/2020
(Continued)

OTHER PUBLICATIONS

Written Opinion (PCT/ISA/237) issued by the International Searching Authority on Sep. 28, 2021 in corresponding International Application No. PCT/KR2021/000747.
(Continued)

*Primary Examiner* — Chun Cao
(74) *Attorney, Agent, or Firm* — Sughrue Mion, PLLC

(57) ABSTRACT

An electronic device, including: at least one sensor; a communication circuit; a memory; and at least one processor operationally connected with the at least one sensor, the communication circuit, and the memory, wherein the at least one processor is configured to: identify an internal temperature of the electronic device using the at least sensor; provide, to an external device, internal temperature data associated with the internal temperature of the electronic device; receive a surface temperature prediction model for predicting a surface temperature of the electronic device from the external device; predict the surface temperature of the electronic device based on the surface temperature prediction model and information associated with a module location, the information being stored in the memory; and select at least one heat source to enter heating control from among a plurality of modules of the electronic device based on the predicted surface temperature.

17 Claims, 7 Drawing Sheets

(58) Field of Classification Search
USPC .......................................................... 700/300
See application file for complete search history.

(56) References Cited

U.S. PATENT DOCUMENTS

| | | | |
|---|---|---|---|
| 8,452,463 B2 | 5/2013 | Cox et al. | |
| 9,606,591 B2 | 3/2017 | Kwon et al. | |
| 9,618,945 B2 | 4/2017 | Delano et al. | |
| 9,667,280 B2 | 5/2017 | Shahidi et al. | |
| 9,696,214 B2 | 7/2017 | Niederberger et al. | |
| 10,126,794 B2 | 11/2018 | Bang et al. | |
| 10,198,049 B2 | 2/2019 | Kwon et al. | |
| 10,409,301 B2 | 9/2019 | Ishii et al. | |
| 10,488,873 B2 | 11/2019 | Delano et al. | |
| 10,503,222 B2 | 12/2019 | Mittal et al. | |
| 10,739,206 B2 | 8/2020 | Pan et al. | |
| 10,942,067 B2 | 3/2021 | Pan et al. | |
| 11,044,201 B2 | 6/2021 | Jang et al. | |
| 2002/0169924 A1 | 11/2002 | Osborn | |
| 2009/0299543 A1* | 12/2009 | Cox .................... | G06F 1/206 |
| | | | 713/300 |
| 2011/0301777 A1 | 12/2011 | Cox et al. | |
| 2014/0266405 A1 | 9/2014 | Barnes et al. | |
| 2014/0328367 A1 | 11/2014 | Niederberger et al. | |
| 2015/0005980 A1 | 1/2015 | Kim et al. | |
| 2015/0088333 A1 | 3/2015 | Delano et al. | |
| 2016/0062326 A1 | 3/2016 | Bang et al. | |
| 2016/0252939 A1 | 9/2016 | Bang et al. | |
| 2017/0083064 A1 | 3/2017 | Mittal et al. | |
| 2017/0147017 A1 | 5/2017 | Ishii et al. | |
| 2017/0212537 A1 | 7/2017 | Delano et al. | |
| 2018/0245986 A1 | 8/2018 | Pan et al. | |
| 2019/0064892 A1 | 2/2019 | Kim et al. | |
| 2020/0367176 A1 | 11/2020 | Lee et al. | |
| 2021/0302239 A1 | 9/2021 | Nagano et al. | |
| 2022/0107674 A1 | 4/2022 | Kim et al. | |
| 2023/0189470 A1* | 6/2023 | Bang ...................... | G06F 1/206 |
| | | | 700/300 |

FOREIGN PATENT DOCUMENTS

| | | |
|---|---|---|
| KR | 10-2013-0038440 A | 4/2013 |
| KR | 10-2015-0058810 A | 5/2015 |
| KR | 2016-0026329 A | 3/2016 |
| KR | 10-2016-0060057 A | 5/2016 |
| KR | 10-2016-0085052 A | 7/2016 |
| KR | 10-2017-0016213 A | 2/2017 |
| KR | 10-1840852 B1 | 3/2018 |
| KR | 10-2018-0113861 A | 10/2018 |
| KR | 10-2019-0021663 A | 3/2019 |
| KR | 10-2123178 B1 | 6/2020 |
| KR | 10-2020-0132161 A | 11/2020 |
| KR | 10-2021-0029487 A | 3/2021 |
| WO | 2014/159398 A1 | 10/2014 |

OTHER PUBLICATIONS

International Search Report (PCT/ISA/210) issued by the International Searching Authority on Sep. 28, 2021 in corresponding International Application No. PCT/KR2021/000747.

Communication dated Nov. 14, 2024, issued by the Korean Intellectual Property Office in Korean Application No. 10-2021-0003804.

Communication issued Jun. 24, 2025 by the Korean Intellectual Property Office in Korean Patent Application No. KR 10-2021-0003804.

* cited by examiner

ELECTRONIC DEVICE AND CONTROL METHOD THEREFOR

CROSS-REFERENCE TO RELATED APPLICATION

This application is a continuation application of International Application No. PCT/KR2021/000747, filed on Jan. 19, 2021, which is based on and claims priority to Korean Patent Application No. 10-2021-0003804, filed on Jan. 12, 2021, in the Korean Intellectual Property Office, the disclosures of which are incorporated by reference herein in their entireties.

BACKGROUND

1. Field

The disclosure relate to an electronic device and a control method therefor.

2. Description of Related Art

An electronic device may operate using its internal components. For example, modules included in the electronic device may operate in any one of a normal mode for operating at normal performance and a heating control mode for operating at performance lower than the normal performance, such that heat generated from the module is reduced. The electronic device may include a temperature sensor which measures an internal temperature of the electronic device. When the internal temperature of the electronic device, which is measured by the temperature sensor, is greater than or equal to a specified heating control entry temperature, the electronic device may enter a heating control mode.

An electronic device may enter a heating control mode based on an internal temperature of the electronic device, which is measured by a temperature sensor. When the internal temperature of the electronic device is greater than or equal to a heating control entry temperature, the electronic device may collectively operate in the heating control mode.

When the electronic device operates, heat may be momentarily generated by a module which performs a main operation among modules included in the electronic device. The module which performs the main operation may be a heat source. The amount of change in temperature by the heat source may be greater than the amount of change in surface temperature of the electronic device. When heat is momentarily generated by the module when the electronic device may enter the heating control mode based on the internal temperature of the electronic device, although the surface temperature of the electronic device may be less than or equal to the heating control entry temperature, the electronic device may enter the heating control mode. Thus, the electronic device may unnecessarily enter the heating control mode.

Furthermore, when the electronic device operates, a portion at which the heat source is disposed may increase in temperature, and a temperature of the remaining portion may be maintained. When a temperature of a specific portion in the inside of the electronic device becomes greater than or equal to the heating control entry temperature, the entire electronic device may enter the heating control mode. Thus, a module disposed in a portion which is less than or equal to the heating control entry temperature may also unnecessarily enter the heating control mode.

SUMMARY

Provided is a method for controlling an electronic device to predict a surface temperature of the electronic device such that a portion at which the surface temperature is greater than or equal to a heating control entry temperature enters a heating control mode based on the predicted surface temperature and an electronic device applying the method.

In accordance with an aspect of the disclosure, an electronic device includes at least one sensor; a communication circuit; a memory; and at least one processor operationally connected with the at least one sensor, the communication circuit, and the memory, wherein the at least one processor is configured to: identify an internal temperature of the electronic device using the at least sensor; provide, to an external device, internal temperature data associated with the internal temperature of the electronic device; receive a surface temperature prediction model for predicting a surface temperature of the electronic device from the external device; predict the surface temperature of the electronic device based on the surface temperature prediction model and information associated with a module location, the information being stored in the memory; and select at least one heat source to enter heating control from among a plurality of modules of the electronic device based on the predicted surface temperature.

The at least one processor may be further configured to: predict the surface temperature of the electronic device, the predicted surface temperature being represented two-dimensionally based on the internal temperature of the electronic device; and generate a heat map based on the predicted surface temperature.

The at least one processor may be further configured to: analyze the heat map based on the information associated with the module location; and collect information associated with heat diffusion on a surface of the electronic device based on the analyzing of the heat map.

The at least one processor may be further configured to: generate a limitation policy for limiting operation performance of the electronic device based on the analyzing of the heat map and a temperature policy.

The at least one processor may be further configured to: select a module disposed in a portion of the electronic device at which the predicted surface temperature is greater than or equal to a heating control entry temperature as the at least one heat source to enter the heating control.

The at least one processor may be further configured to: identify a module disposed adjacent to a heated portion as an adjacent module based on the information associated with the module location.

The at least one processor may be further configured to: control the adjacent module, based on the adjacent module increasing in temperature and being influenced by the at least one heat source.

Th at least one processor may be further configured to: receive a result of scaling and analyzing the surface temperature from the external device or a server, and select the at least one heat source based on the result.

In accordance with an aspect of the disclosure, a method for controlling an electronic device includes identifying an internal temperature of the electronic device using at least one sensor; providing, to an external device, internal temperature data associated with the internal temperature of the electronic device; receiving a surface temperature prediction model for predicting a surface temperature of the electronic device from the external device; predicting the surface temperature of the electronic device based on the surface temperature prediction model and information associated with a module location, the information being stored in a memory of the electronic device; and selecting at least one heat source to enter heating control from among a plurality of modules of the electronic device based on the predicted surface temperature.

The predicting of the surface temperature may include: predicting the surface temperature of the electronic device, wherein the surface temperature is represented two-dimensionally based on the internal temperature of the electronic device; and generating a heat map based on the predicted surface temperature.

The predicting of the surface temperature may further include: analyzing the heat map based on the information associated with the module location; and collecting information associated with heat diffusion on a surface of the electronic device based on the analyzing of the heat map.

The predicting of the surface temperature may further include: generating a limitation policy for limiting operation performance of the electronic device based on the analyzing of the heat map and a temperature policy.

The selecting of the at least one heat source may include: selecting a module disposed in a portion of the electronic device at which the predicted surface temperature is greater than or equal to a heating control entry temperature as the at least one heat source to enter the heating control.

The predicting of the surface temperature may include: identifying a module disposed adjacent to a heated portion as an adjacent module based on the information associated with the module location.

The selecting of the at least one heat source may include: controlling the adjacent module, when the adjacent module increases in temperature and is influenced by the at least one heat source.

In accordance with an aspect of the disclosure, a non-transitory computer-readable storage medium is configured to store instructions which, when executed by at least one processor, cause the at least one processor to: identify an internal temperature of an electronic device using at least one sensor; provide, to an external device, internal temperature data associated with the internal temperature of the electronic device; receive a surface temperature prediction model for predicting a surface temperature of the electronic device from the external device; predict the surface temperature of the electronic device based on the surface temperature prediction model and information associated with a module location, the information being stored in a memory of the electronic device; and select at least one heat source to enter heating control from among a plurality of modules of the electronic device based on the predicted surface temperature.

The predict the surface temperature, the instructions may further cause the at least one processor to: predict the surface temperature of the electronic device, wherein the surface temperature is represented two-dimensionally based on the internal temperature of the electronic device; and generate a heat map based on the predicted surface temperature.

To predict the surface temperature, the instructions may further cause the at least one processor to: analyze the heat map based on the information associated with the module location; and collect information associated with heat diffusion on a surface of the electronic device based on the analyzing of the heat map.

To predict the surface temperature, the instructions may further cause the at least one processor to: generate a limitation policy for limiting operation performance of the electronic device based on the analyzing of the heat map and a temperature policy.

To select the at least one heat source, the instructions may further cause the at least one processor to: select a module disposed in a portion of the electronic device at which the predicted surface temperature is greater than or equal to a heating control entry temperature as the at least one heat source to enter the heating control.

According to embodiments disclosed in the disclosure, a temperature for the entire surface of the electronic device may be predicted two-dimensionally using an internal temperature of the electronic device to generate a heat map. Thus, because a heating control mode may be entered based on the surface temperature of the electronic device being predicted as a heating control entry temperature or more, the case in which the electronic device unnecessarily enter the heating control mode may be reduced.

Furthermore, according to embodiments disclosed in the disclosure, the surface temperature of the electronic device may be predicted and a module disposed in a portion at which the predicted surface temperature is greater than or equal to a heating control entry temperature may be entered in the heating control mode. Thus, heating control may be performed for only the module disposed in the portion which is greater than or equal to the heating control entry temperature, and modules arranged in the remaining portions may perform their operations at optimal performance.

Furthermore, according to embodiments disclosed in the disclosure, when a temperature which is greater than or equal to the heating control entry temperature is predicted in a specific portion of the surface of the electronic device by a heat source adjacent to the specific portion according to the predicted surface temperature of the electronic device, the heat source adjacent to the specific portion may be entered in the heating control mode to prevent the specific portion from overheating.

In addition, various effects ascertained directly or indirectly through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components may be marked by the same or similar reference numerals.

DETAILED DESCRIPTION

Hereinafter, various embodiments of the disclosure are described with reference to the accompanying drawings. However, this is not intended to limit the disclosure to specific embodiments. It should be understood that the disclosure includes various modifications, equivalents, and/or alternatives to the embodiments of the disclosure.

According to embodiments, a temperature for the entire surface of the electronic device may be predicted two-dimensionally using an internal temperature of the electronic device to generate a heat map. Thus, because it is able to enter a heating control mode when the surface temperature of the electronic device is predicted as a heating control entry temperature or more, the case in which the electronic device unnecessarily enters the heating control mode may be reduced.

Furthermore, according to embodiments, the surface temperature of the electronic device may be predicted and a module disposed in a portion at which the predicted surface temperature is greater than or equal to a heating control entry temperature may be entered in the heating control mode. Thus, heating control may be performed for only the module disposed in the portion which it is greater than or equal to the heating control entry temperature and modules arranged in the remaining portions may perform their operations at optimal performance.

Furthermore, according to embodiments, when a temperature which is greater than or equal to the heating control entry temperature is predicted in a specific portion of the surface of the electronic device by a heat source adjacent to the specific portion according to the predicted surface temperature of the electronic device, the heat source adjacent to the specific portion may be entered in the heating control mode to prevent the specific portion from overheating.

In addition, various effects ascertained directly or indirectly through the disclosure may be provided.

Figure 1:
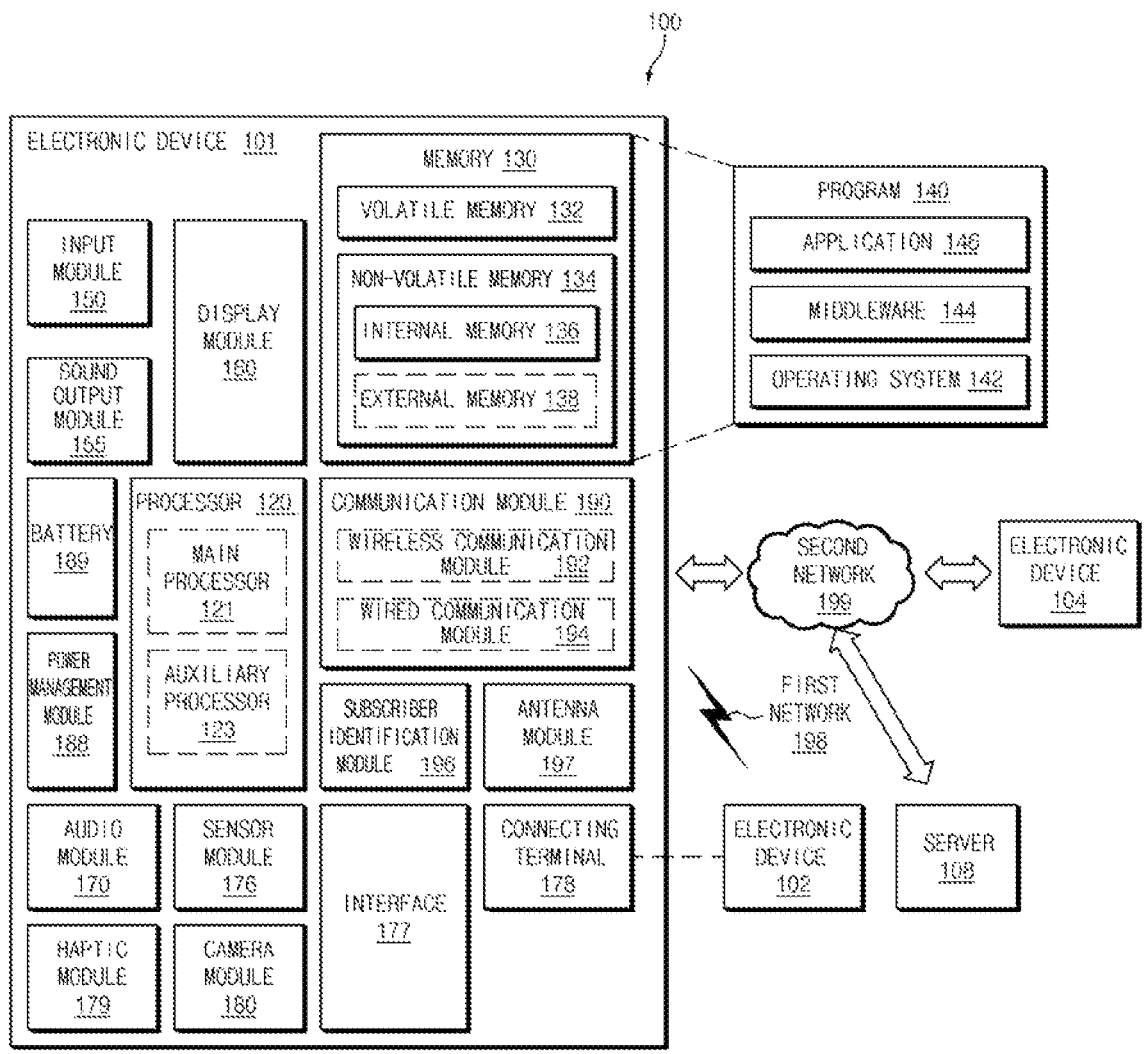
FIG. 1 is a block diagram of an electronic device in a network environment, according to an embodiment.

FIG. 1 is a block diagram illustrating an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 at which the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
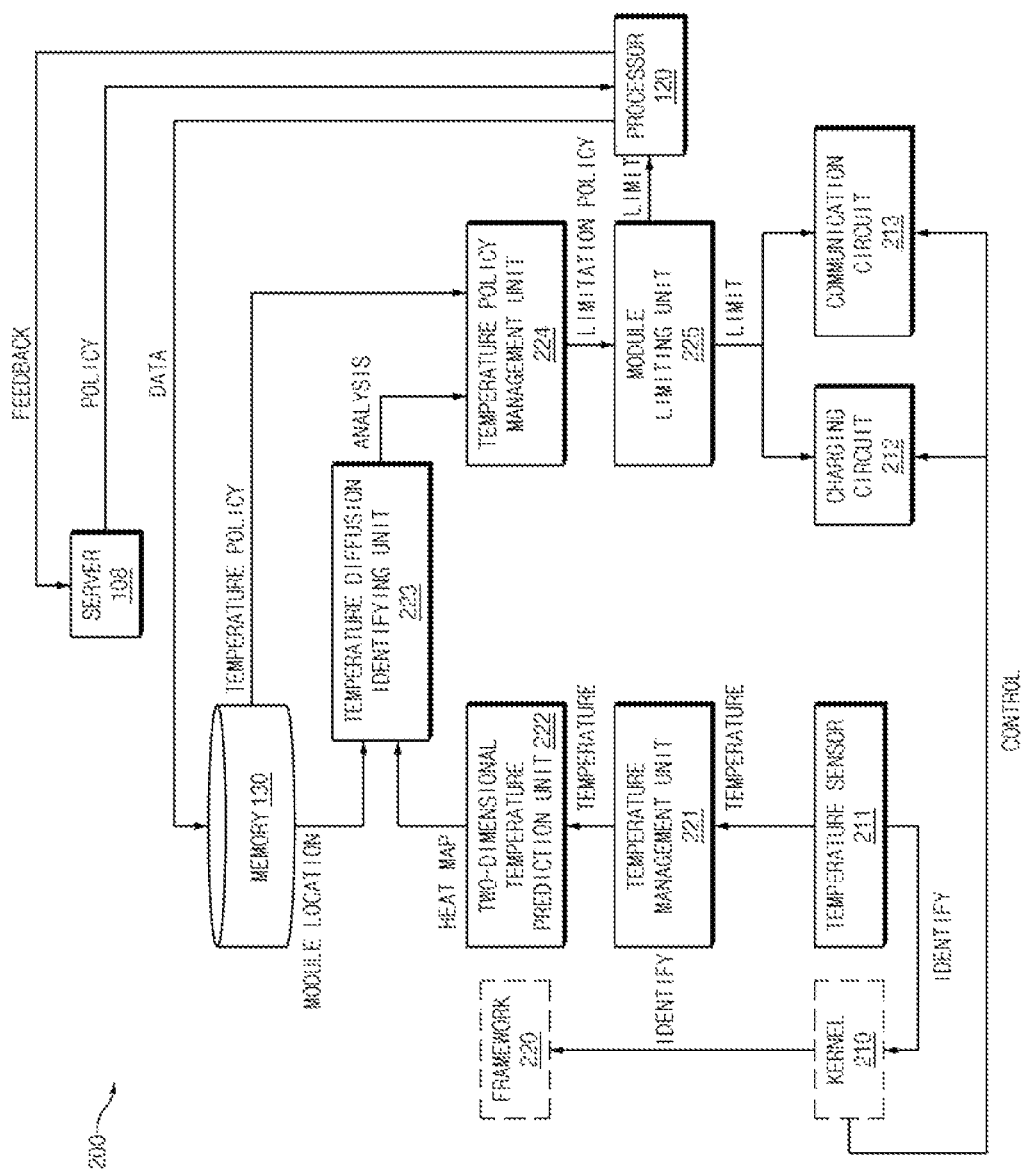
FIG. 2 is a block diagram illustrating an electronic device and a server according to an embodiment.

FIG. 2 is a block diagram illustrating an electronic device (e.g., an electronic device 101 of FIG. 1) and a server 108 according to an embodiment.

In an embodiment, the electronic device 101 may perform heating control. The components constituting the electronic device 101 may operate in any one of a normal mode for operating at normal performance and a heating control mode for operating at performance lower than the normal performance such that heat generated from the module is reduced. The module may be a processor 120, a charging circuit 212, a communication circuit 213, a display (e.g., a display module 160 of FIG. 1), a camera (e.g., a camera module 180 of FIG. 1), or another type of electronic component. The module which is operating may be a heat source. When the electronic device 101 wants to reduce heat generated as the electronic device 101 operates, it may operate in the heating control mode.

In an embodiment, the electronic device 101 may include a kernel 210 and a framework 220. The kernel 210 may allocate a resource for operating the electronic device 101. The kernel 210 may operate modules of the electronic device 101 in the normal mode or the heating control mode. The framework 220 may define software (SW) for operating the electronic device 101. The framework 220 may control functions in which the electronic device 101 operates in the normal mode or the heating control mode. The kernel 210 and the framework 220 may be represented as at least one operation performed as the processor 120 executes instructions stored in a memory 130.

In an embodiment, the kernel 210 may control the charging circuit 212 (e.g., a power management module 188 of FIG. 1) and the communication circuit 213 (e.g., a wireless communication module 192 of FIG. 1). The kernel 210 may be an abstract module operated by the processor 120. The kernel 210 may be software capable of controlling the charging circuit 212 and the communication circuit 213. The kernel 210, a temperature sensor 211, the processor 120, the charging circuit 212, and the communication circuit 213 may be operationally connected with each other. The kernel 210, the temperature sensor 211, the processor 120, the charging circuit 212, and the communication circuit 213 may be electrically with each other.

In an embodiment, the temperature sensor 211 may be disposed in the electronic device 101. The at least one or more temperature sensors 211 may be arranged. The temperature sensor 211 may be disposed adjacent to the module. The temperature sensor 211 may measure internal temperatures of the electronic device 101. The temperature sensor 211 may be a thermistor. The temperature sensor 211 may measure an internal temperature of the electronic device 101 on a periodic basis or in real time. The kernel 210 may identify a value of the internal temperature measured on a periodic basis by the temperature sensor 211. The kernel 210 may update the identified value of the internal temperature. The framework 220 may identify the updated value of the internal temperature on a periodic basis. Thus, the processor 120 may identify internal temperatures of the electronic device 101 based on at least one sensor (e.g., the temperature sensor 211).

In an embodiment, the processor 120 may control the overall operation of the electronic device 101. Performance of an operation of the processor 120 may be limited by the framework 220. When a surface temperature of a portion at which the processor 120 is disposed is greater than or equal to a heating control entry temperature, the processor 120 may operate in the heating control mode.

In an embodiment, the charging circuit 212 may supply a charging current to a battery (e.g., a battery 189 of FIG. 1) of the electronic device 101. Performance of an operation of the charging circuit 212 may be limited by the framework 220. When a surface temperature of a portion at which the charging circuit 212 is disposed is greater than or equal to the heating control entry temperature, the charging circuit 212 may operate in the heating control mode.

In an embodiment, the communication circuit 213 may establish a wireless communication connection between the electronic device 101 and a base station. Performance of an operation of the communication circuit 213 may be limited by the framework 220. When a surface temperature of a portion at which the communication circuit 213 is disposed is greater than or equal to the heating control entry temperature, the communication circuit 213 may operate in the heating control mode.

In an embodiment, the framework 220 may be a software function operated by the processor 120. The framework 220 may include a temperature management unit 221, a two-dimensional temperature prediction unit 222, a temperature diffusion identifying unit 223, a temperature policy management unit 224, and a module limiting unit 225. Data generated by the operation of the framework 220 may be stored in the memory 130. The memory 130 may be electrically connected with the processor 120. The memory 130 may be operationally connected with the processor 120.

In an embodiment, the server 108 may be a separate device outside the electronic device 101.

In an embodiment, the temperature management unit 221 may receive or identify the internal temperature of the electronic device 101, which is measured by the temperature sensor 211. The temperature management unit 221 may identify an internal temperature value of the electronic device 101, which is stored in the memory 130. The temperature management unit 221 may collect information associated with the internal temperature of the electronic device 101. The temperature management unit 221 may transmit the internal temperature of the electronic device 101 to the two-dimensional temperature prediction unit 222. The temperature management unit 221 may be collectively referred to as a temperature manager.

In an embodiment, the two-dimensional temperature prediction unit 222 may receive the internal temperature of the electronic device 101 from the temperature management unit 221. The two-dimensional temperature prediction unit 222 may collect information associated with the surface of the electronic device 101. For example, the two-dimensional temperature prediction unit 222 may collect information associated with the surface of the display module 160, which is exposed to a front side of the electronic device 101. The two-dimensional temperature prediction unit 222 may two-dimensionally represent the entire surface of the electronic device 101. The two-dimensional temperature prediction unit 222 may predict the surface temperature of the electronic device 101, which is two-dimensionally represented based on the internal temperature of the electronic device 101. The two-dimensional temperature prediction unit 222 may predict a temperature of the entire surface of the electronic device 101. The two-dimensional temperature prediction unit 222 may generate a heat map based on the surface temperature. The heat map may be data in the form of a map in which the surface temperature of the electronic device 101 is predicted and displayed two-dimensionally. The heat map may digitalize a surface temperature value of the electronic device 101 in the form of a two-dimensional integer array. The heat map may be represented as visualized data. For example, the heat map may be a graphic type map which displays an area with a high surface temperature in the surface of the electronic device 101 in red and displays an area with a low surface temperature in the surface of the electronic device 101 in blue. The two-dimensional temperature prediction unit 222 may transmit the generated heat map to the temperature diffusion identifying unit 223.

In an embodiment, the temperature diffusion identifying unit 223 may receive the heat map from the two-dimensional temperature prediction unit 222. The temperature diffusion identifying unit 223 may identify information associated with a module location, which is stored in the memory 130. The temperature diffusion identifying unit 223 may analyze the heat map. The temperature diffusion identifying unit 223 may analyze the heat map based on the information associated with the module location. The temperature diffusion identifying unit 223 may collect information associated with heat diffusion on the surface of the electronic device 101 based on the analysis of the heat map. The temperature diffusion identifying unit 223 may transmit the result of analyzing the heat map to the temperature policy management unit 224.

In an embodiment, the memory 130 may store the information associated with the module location. The memory 130 may load the stored information associated with the module location in response to the identification of the temperature diffusion identifying unit 223.

In an embodiment, the processor 120 may receive a policy from the server 108. The policy may include rules associated with an operation of the electronic device 101. The policy may include a temperature policy including rules for a temperature of the electronic device 101. The processor 120 may receive the policy using a software module which operates using the processor 120. For example, the processor 120 may receive the policy using the framework 220. The processor 120 may transmit feedback on the policy to the server 108.

In an embodiment, the temperature policy management unit 224 may receive the analyzed result from the temperature diffusion identifying unit 223. The temperature policy management unit 224 may identify a temperature policy from the memory 130. The temperature policy management unit 224 may generate a limitation policy for limiting operation performance of the electronic device 101 based on the analyzed result and the temperature policy. The temperature policy management unit 224 may transmit the generated limitation policy to the module limiting unit 225.

In an embodiment, the module limiting unit 225 may receive the limitation policy from the temperature policy management unit 224. The module limiting unit 225 may limit performance of at least one module based on the limitation policy. For example, the module limiting unit 225 may limit performance of at least one of the processor 120, the charging circuit 212, and the communication circuit 213. The module limiting unit 225 may allow at least one of the processor 120, the charging circuit 212, and the communication circuit 213 to enter the heating control mode.

Figure 3:
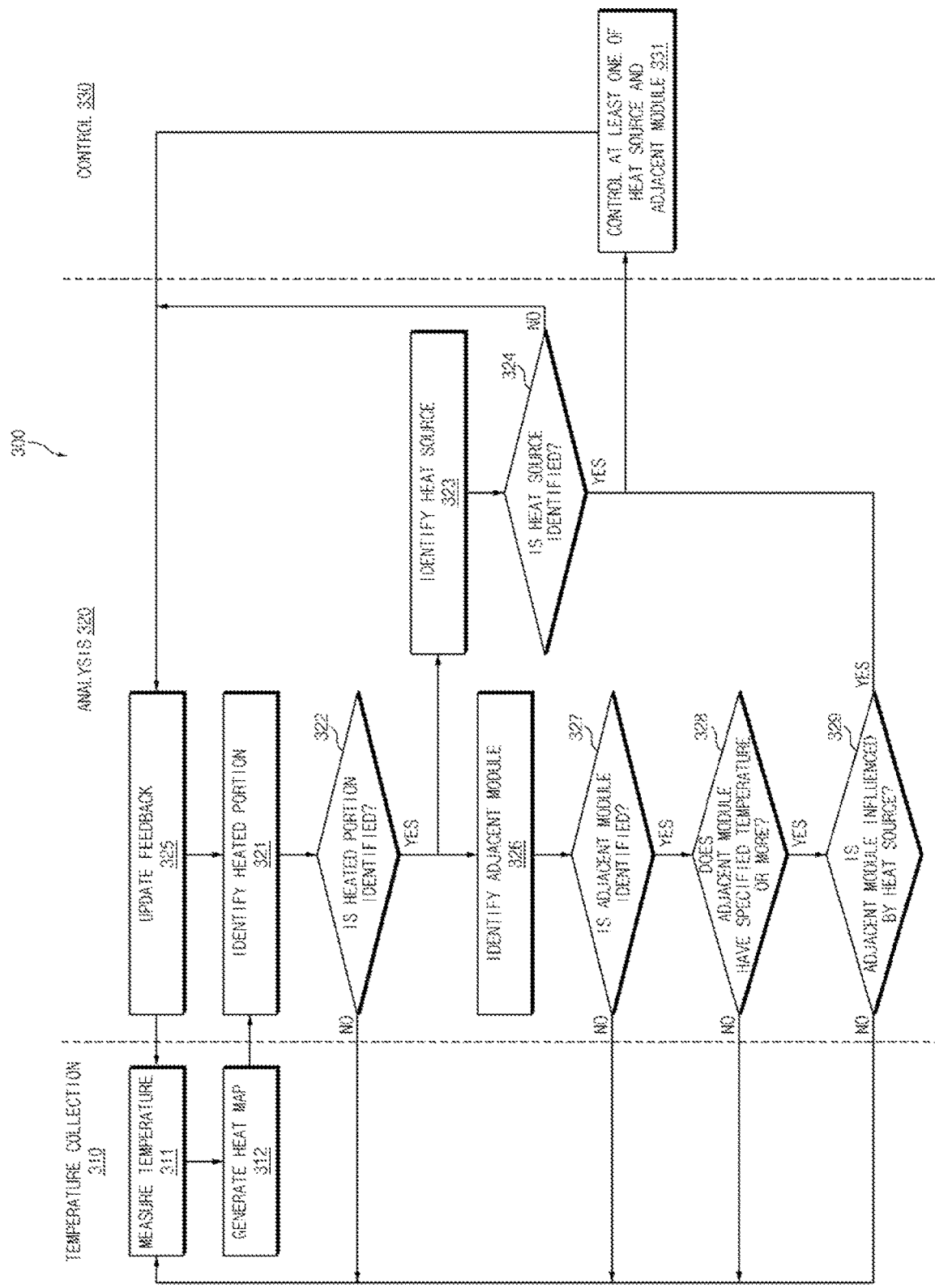
FIG. 3 is a flowchart illustrating a method for controlling an electronic device according to an embodiment.

FIG. 3 is a flowchart illustrating a process 300 for controlling an electronic device (e.g., an electronic device 101 of FIG. 1) according to an embodiment.

The electronic device 101 according to an embodiment may perform temperature collection at operation 310, analysis at operation 320, and control at operation 330. Operation 310 may include measuring a temperature at a temperature sensor (e.g., a temperature sensor 211 of FIG. 2) in the electronic device 101 supported in hardware (HW), and predicting a temperature of the entire surface of the electronic device 101 using a temperature prediction circuit (e.g., a two-dimensional temperature prediction unit 222 of FIG. 2). Operation 320 may include analyzing heat diffusion based on the surface temperature predicted by a temperature diffusion identifying unit (e.g., a temperature diffusion identifying unit 223 of FIG. 2). Operation 330 may include determining control using data analyzed by a module limiting unit (e.g., a module limiting unit 225 of FIG. 2).

In an embodiment, operation 310 may include temperature measurement at operation 311 and heat map generation at operation 312.

In operation 311, a temperature sensor 211 of the electronic device 101 according to an embodiment may measure a temperature. The temperature sensor 211 may measure an internal temperature of the electronic device 101. The temperature sensor 211 may transmit the measured temperature to the two-dimensional temperature prediction unit 222.

In operation 312, the two-dimensional temperature prediction unit 222 of the electronic device 101 according to an embodiment may generate a heat map. The two-dimensional temperature prediction unit 222 may predict a surface temperature of the electronic device 101 based on the internal temperature of the electronic device 101 and information associated with a surface of the electronic device 101. The two-dimensional temperature prediction unit 222 may generate a heat map which represents the surface temperature of the electronic device 101 on the surface of the electronic device 101. The two-dimensional temperature prediction unit 222 may transmit the generated heat map to the temperature diffusion identifying unit 223.

In an embodiment, operation 320 may include heated portion identifying at operation 321 and operation 322, heat source identifying at operation 323 and operation 324, feedback update at operation 325, and adjacent module identifying at operation 326, operation 327, operation 328, and operation 329.

In operation 321, the temperature diffusion identifying unit 223 of the electronic device 101 according to an embodiment may identify a heated portion. The temperature diffusion identifying unit 223 may identify whether there is a portion at which a surface temperature is higher than another portion on the surface of the electronic device 101 on the heat map. The temperature diffusion identifying unit 223 may identify whether there is a portion at which the surface temperature is greater than or equal to a heating control entry temperature on the heat map.

In operation 322, the temperature diffusion identifying unit 223 of the electronic device 101 according to an embodiment may determine whether the heated portion is identified. When the heated portion is identified (YES at operation 322), the temperature diffusion identifying unit 223 may proceed to operation 323 and operation 326. When the heated portion is not identified (NO at operation 322), the temperature diffusion identifying unit 223 may return to operation 311.

In operation 323, the temperature diffusion identifying unit 223 of the electronic device 101 according to an embodiment may identify a heat source. The temperature diffusion identifying unit 223 may identify a module disposed in the heated portion based on the information associated with the module location. The temperature diffusion identifying unit 223 may identify the module disposed in the heated portion as the heat source.

In operation 324, the temperature diffusion identifying unit 223 of the electronic device 101 according to an embodiment may determine whether the heat source is identified. When the heat source is identified (YES at operation 324), the temperature diffusion identifying unit 223 may proceed to operation 331. When the heat source is not identified (NO at operation 324), the temperature diffusion identifying unit 223 may return to operation 325.

In operation 325, the temperature diffusion identifying unit 223 of the electronic device 101 according to an embodiment may update feedback. The temperature diffusion identifying unit 223 may feed back information associated with the internal temperature measured by the temperature sensor 211. The temperature diffusion identifying unit 223 may feed back information associated with identifying a heated portion on the heat map.

In operation 326, the temperature diffusion identifying unit 223 of the electronic device 101 according to an embodiment may identify an adjacent module. The temperature diffusion identifying unit 223 may identify a module disposed adjacent to the heated portion based on the information associated with the module location. The temperature diffusion identifying unit 223 may identify the module disposed adjacent to the heated portion as the adjacent module.

In operation 327, the temperature diffusion identifying unit 223 of the electronic device 101 according to an embodiment may determine whether the adjacent module is identified. When the adjacent module is identified (YES at operation 327), the temperature diffusion identifying unit 223 may proceed to operation 328. When the adjacent module is not identified (NO at operation 327), the temperature diffusion identifying unit 223 may return to operation 311.

In operation 328, the temperature diffusion identifying unit 223 of the electronic device 101 according to an embodiment may determine whether the adjacent module has a specified temperature or more. The specified temperature may be a temperature at which a temperature of a portion adjacent to the adjacent module starts to increase to greater than an ambient temperature. The specified temperature may be the same temperature as a temperature of the heated portion. When the adjacent module has the specified temperature or more (YES at operation 328), the temperature diffusion identifying unit 223 may proceed to operation 329. When the adjacent module has less than the specified temperature (NO at operation 328), the temperature diffusion identifying unit 223 may return to operation 311.

In operation 329, the temperature diffusion identifying unit 223 of the electronic device 101 according to an embodiment may determine whether the adjacent module is influenced by the heat source. The temperature diffusion identifying unit 223 may determine whether the adjacent module increases in temperature by influence of heat diffused from the heat source. When the adjacent module is influenced by the heat source (YES at operation 329), the temperature diffusion identifying unit 223 may proceed to operation 331. When the adjacent module is not influenced by the heat source (NO at operation 329), the temperature diffusion identifying unit 223 may return to operation 311.

In an embodiment, operation 330 may include controlling at least one of the heat source and the adjacent module at operation 331.

In operation 331, the module limiting unit 225 of the electronic device 101 according to an embodiment may control at least one of the heat source and the adjacent module. The temperature diffusion identifying unit 223 may provide the analyzed result to a temperature policy management unit (e.g., a temperature policy management unit 224 of FIG. 2). The temperature policy management unit 224 may generate a limitation policy based on the analyzed result. The temperature policy management unit 224 may provide the limitation policy to the module limiting unit 225. The module limiting unit 225 may control at least one of the heat source and the adjacent module based on the limitation policy. When the heat source is identified (YES at operation 324), the module limiting unit 225 may operate the heat source in a heating control mode. When the adjacent module is influenced by the heat source (YES at operation 329), the module limiting unit 225 may operate the adjacent module in the heating control mode.

The electronic device 101 according to an embodiment may operate in a normal mode before the heated portion and the heat source are identified. Thus, the electronic device 101 may decrease the case in which modules unnecessarily enter the heating control mode.

Furthermore, the electronic device 101 according to an embodiment may operate the identified heat source in the heating control mode. Thus, the electronic device 101 may allow the remaining modules except for the module identified as the heat source to perform operations at optimal performance.

Furthermore, when the adjacent module is influenced by the heat source, the electronic device 101 according to an embodiment may operate the adjacent module in the heating control mode. Thus, the electronic device 101 may perform preventive control for the adjacent module to decrease overheating of the adjacent module.

Figure 4:
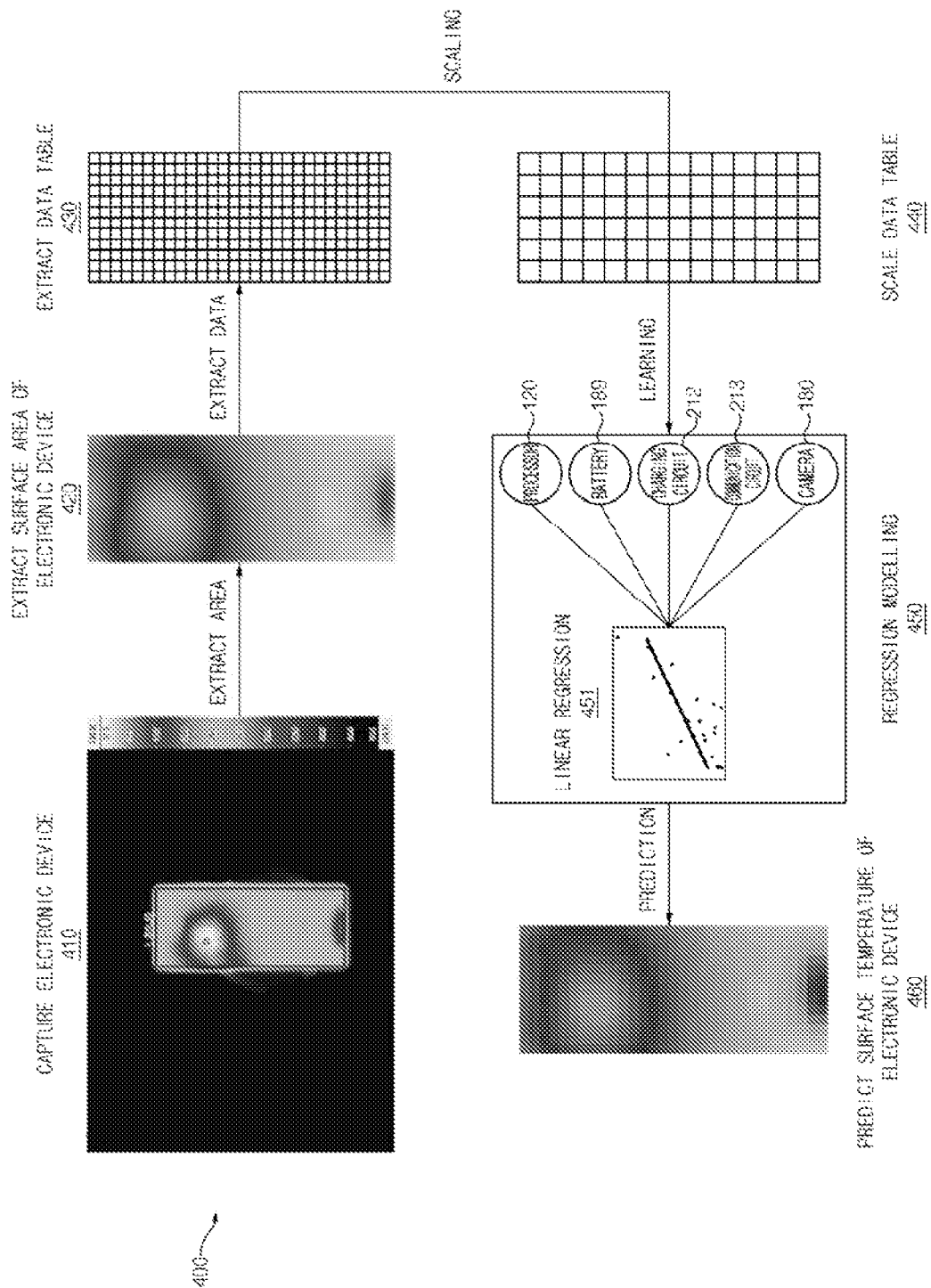
FIG. 4 is a drawing illustrating predicting a surface temperature of an electronic device according to an embodiment.

FIG. 4 is a drawing illustrating a process 400 for predicting a surface temperature of an electronic device (e.g., an electronic device 101 of FIG. 1) according to an embodiment.

In an embodiment, an external device may capture the electronic device 101 at operation 410. The external device may be an infrared image capturing device. The external device may capture an infrared photo capable of indicating an internal temperature and/or a surface temperature of the electronic device 101. The external device may obtain image data associated with the internal temperature and/or the surface temperature of the electronic device 101 in a process of manufacturing the electronic device 101. The external device may transmit the image data associated with the internal temperature and/or the surface temperature of the electronic device 101 to a server (e.g., a server 108 of FIG. 1).

In an embodiment, the external device may extract an area of the electronic device 101. The external device may extract a surface area of the electronic device 101 at operation 420. For example, the external device may extract a surface of a portion at which a display (e.g., a display module 160 of FIG. 1) is disposed from a front side of the electronic device 101.

In an embodiment, the external device may extract data from the extracted surface area of the electronic device 101. The external device may extract a data table at operation 430. The data table may divide the surface area into a plurality of subunit portions. The data table may include temperature data of each of the plurality of subunit portions.

In an embodiment, the external device may scale the extracted data table at operation 440. The external device may transmit the scaled data table to the server 108.

In an embodiment, the server 108 may apply regression modelling at operation 450 to learn the scaled data table. The server 108 may learn the scaled data table in a method of linear regression 451. The server 108 may learn temperatures of portions at which a processor 120, a battery 189, a charging circuit 212, a communication circuit 213, and a camera module 180 arranged in the electronic device 101 are arranged. For example, the server 108 may set the scaled data table to target data y. The server 108 may set information including temperatures of respective modules, which are measured by a temperature sensor (e.g., a temperature sensor 211 of FIG. 2), current consumption of the electronic device 101, volume of a speaker (e.g., a sound output module 155 of FIG. 1) of the electronic device 101, and/or a brightness of a screen of a display (e.g., a display module 160 of FIG. 1) of the electronic device 101 to training data x. The server 108 may perform modeling for the linear regression 451 based on the target data y and the training data x. The server 108 may transmit the learned result of performing the modeling for the linear regression 451 to the electronic device 101 which is being manufactured. The learned result may include the modelled equations.

In an embodiment, the processor 120 may perform prediction based on the learned result. The processor 120 may predict a surface temperature of the electronic device 101 at operation 460.

In an embodiment, a temperature management unit (e.g., a temperature management unit 221 of FIG. 2) may measure an internal temperature of the electronic device 101 on a periodic basis using the temperature sensor (e.g., the temperature sensor 211 of FIG. 2) mounted on the electronic device 101. The internal temperature of the electronic device 101 may be calculated using the temperature sensor 211 disposed in the electronic device 101.

In an embodiment, a two-dimensional temperature prediction unit 222 may predict a surface temperature of the electronic device 101 including a front side and a rear side of the electronic device 101 using the measured internal temperature to generate a heat map. The two-dimensional temperature prediction unit 222 may receive a relational expression obtained by the server 108. The server 108 may obtain the relational expression using the regression modelling 450 in supervised learning. The electronic device 101 including the two-dimensional temperature prediction unit 222 may receive the relational expression between the internal temperature and the surface temperature of the electronic device 101 in a development stage.

In an embodiment, the external device may extract a temperature for each of pixels from a captured thermal image of the electronic device 101. For example, when the external device is a thermal imaging camera, it may measure temperatures of the front and rear sides of the electronic device 101. Several modules in the electronic device 101 may operate and function as heat sources upon measurement to select a scenario in which temperature increases, such that the scenario proceeds automatically. The external device may periodically store information of the internal temperature of the electronic device 101 and state information of the electronic device 101, for example, current consumption of the electronic device 101 and screen brightness. The external device may allow a scenario in which the electronic device 101 is used to proceed automatically, thus reducing the case in which an error occurs due to a body temperature of a user. For example, the external device may proceed with modelling for predicting the surface temperature of the electronic device 101 using a temperature for each of the extracted pixels. As another example, the external device may transmit the temperature for each of the extracted pixels to the server 108. In this case, the server 108 may proceed with modelling for predicting the surface temperature of the electronic device 101.

In an embodiment, the two-dimensional temperature prediction unit 222 may predict the surface temperature of the electronic device 101 using at least one formula modelled by the external device or the server 108, the internal temperature measured by the temperature sensor 211, and the state information of the electronic device 101, for example, an operating clock, current consumption, speaker volume, or screen brightness of the electronic device 101. The two-dimensional temperature prediction unit 222 may group a plurality of pixels into a unit portion having an intended area after prediction for all pixels when predicting the surface temperature and may use an average value of temperatures of the pixels in the corresponding area. The two-dimensional temperature prediction unit 222 may select whether to divide and predict the surface of the electronic device 101 to what extent.

Figure 5:
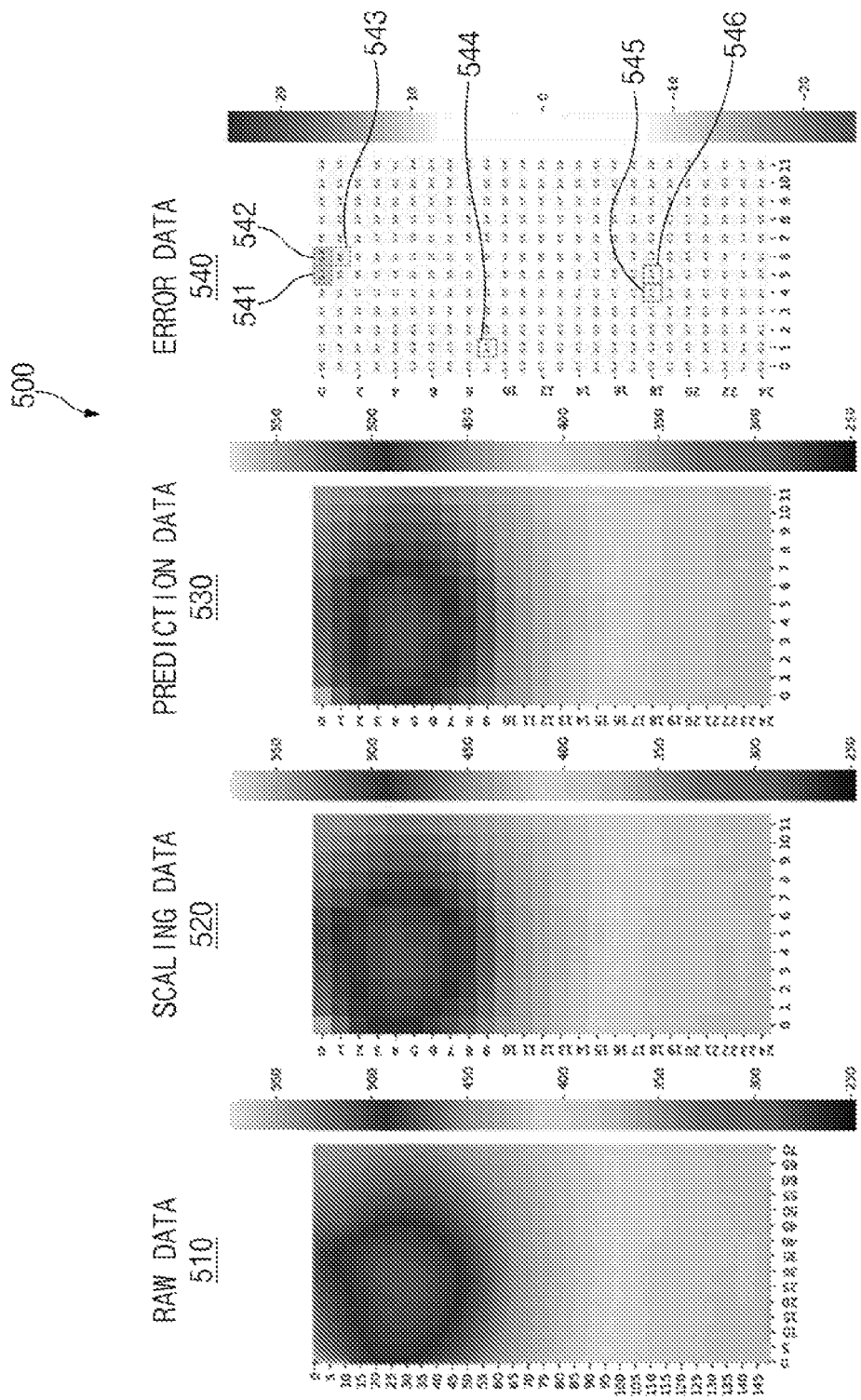
FIG. 5 is a drawing illustrating comparing a predicted surface temperature with a measured surface temperature according to an embodiment.

FIG. 5 is a drawing 500 illustrating comparing a predicted surface temperature with a measured surface temperature according to an embodiment.

In an embodiment, an external device or a server (e.g., a server 108 of FIG. 1) may generate a surface temperature as raw data 510. The external device or the server 108 may scale the raw data 510 to generate scaling data 520. The external device or the server 108 may process the scaling data 520 to generate prediction data 530. The external device or the server 108 may generate error data 540 based on a difference between the prediction data 530 and the scaling data 520. The external device or the server 108 may identify one or more errors, for example error 541, error 542, error 543, error 544, error 545, and error 546, and may update a heat map. In an embodiment, temperature images measured in chronological order by the external device such as a thermal imaging camera may be converted into an actual temperature value on a pixel-by-pixel basis. The raw data 510 may be generated to have a three-dimensional temperature array having a time, an X-axis, and a Y-axis using the actual temperature value.

In an embodiment, although modelling is performed on a pixel-by-pixel basis to generate a heat map and control heating, a temperature for each detailed area by a pixel unit may fail to be required to control heating. When the electronic device 101 calculates a temperature in a pixel unit of the thermal imaging camera, the amount of calculation may increase. The external device or the server 108 may scale the X-axis and the Y-axis into a unit portion having a size greater than a pixel unit to generate the scaling data 520 to reduce the amount of calculation. For example, the external device or the server 108 may proceed with modelling in units of segments obtained by averaging and grouping pixels.

In an embodiment, a chronological array at one point on the X-axis and the Y-axis may be set to target data. A chronological array in the internal temperature of the electronic device 101 may be set to training data. The regression modelling may be executed to derive the target data using the training data. A regression method in a manner such as linear, ridge, or support vector machine (SVM) may be used. When passing through a learning process for the front side and the rear side of the electronic device 101, a surface temperature calculation formula may be determined every points on the surface on the X-axis and the Y-axis of the electronic device 101.

Figure 6:
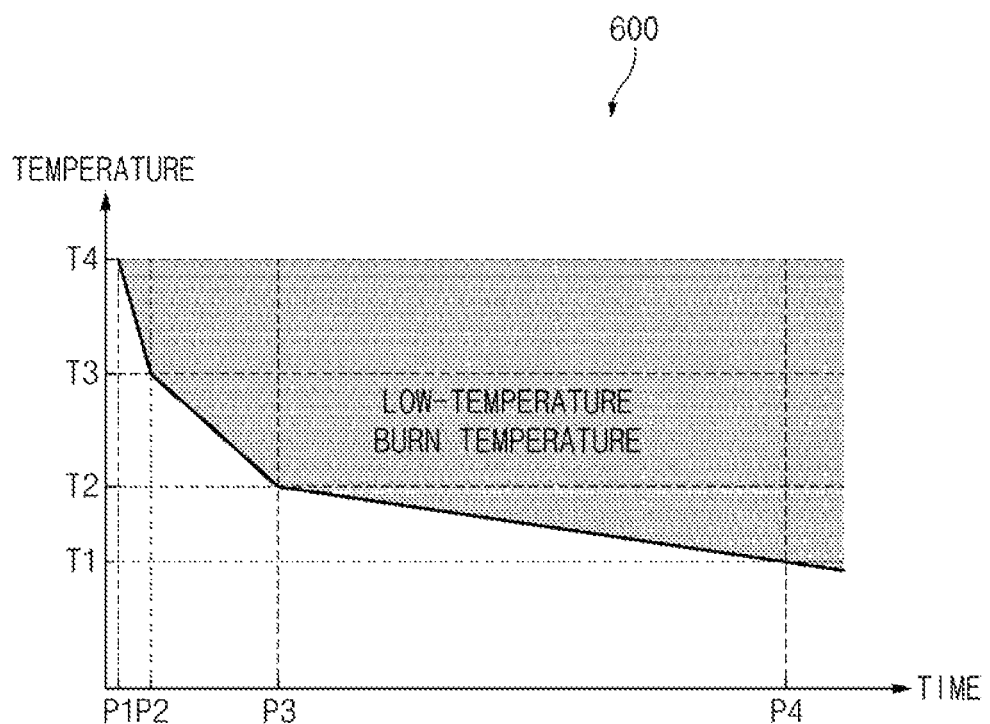
FIG. 6 is a graph illustrating a temperature at which a low-temperature burn temperature occurs over time according to an embodiment.

FIG. 6 is a graph 600 illustrating a temperature at which a low-temperature burn temperature occurs over time according to an embodiment.

In an embodiment, when a first period P1 elapses and when it is greater than or equal to a fourth temperature T4, a low-temperature burn may occur. When a second period P2 longer than the first period P1 elapses and when it is greater than or equal to a third temperature T3 lower than the fourth temperature T4, the low-temperature burn may occur. When a third period P3 longer than the second period P2 elapses and when it is greater than or equal to a second temperature T2 lower than the third temperature T3, the low-temperature burn may occur. When a fourth period P4 longer than the third period P3 elapses and when it is greater than or equal to a first temperature T1 lower than the second temperature T2, the low-temperature burn may occur. For example, when the first period P1 is about 1 minute, the second period P2 is about 10 minutes, the third period P3 is about 2 hours, and the fourth period P4 is about 8 hours, the fourth temperature T4 may be about 51 degrees Celsius, the third temperature T3 may be about 48 degrees Celsius, the second temperature T2 may be about 45 degrees Celsius, and the first temperature T1 may be about 43 degrees Celsius.

In an embodiment, a temperature diffusion identifying unit (e.g., a temperature diffusion identifying unit 223 of FIG. 2) may analyze a heating diffusion form of the surface of the electronic device 101 based on a calculated heat map. The temperature diffusion identifying unit 223 may determine how much a heat source which affects current surface heating and heat diffused from the heat source are affecting other modules, using data associated with a modulation location, which is received from a memory (e.g., a memory 130 of FIG. 1). The temperature diffusion identifying unit 223 may divide a degree of influence of the heat source on the surface into grades and may subdivide control strength for the corresponding module.

In an embodiment, the temperature diffusion identifying unit 223 may report the analyzed contents to a temperature policy management unit (e.g., a temperature policy management unit 224 of FIG. 2). The temperature diffusion identifying unit 223 may report whether there is a module in a heated portion or around the heated portion, whether the module in the heated portion or around the heated portion is a controllable module, and how much heat is reduced according to a current module control scheme to the temperature policy management unit 224. The temperature policy management unit 224 may set a limitation policy about how to improve heating control.

In an embodiment, the temperature diffusion identifying unit 223 may determine or identify a situation in which heat is diffused to reach a corresponding portion before the temperature itself of a specific hardware portion rather than the heat source reaches a heating control entry temperature. The temperature policy management unit 224 may set the limitation policy to control performance of corresponding hardware to a minimum in advance. The temperature policy management unit 224 may set the limitation policy to increase a time taken to reach the heating control entry temperature. The temperature policy management unit 224 may set the limitation policy to increase a performance guaranteed time when the module operates at a certain level or more.

In an embodiment, the temperature diffusion identifying unit 223 store the report result in the memory 130. The report result stored in the memory 130 may be uploaded to a server (e.g., a server 108 of FIG. 1). A developer may review the uploaded report result and may update a heating control policy. The control policy updated by the server 108 may be downloaded to the memory 130. For example, when the server 108 gives an event or when the electronic device 101 is fully reset and a processor 120 is initialized, the updated new control policy may be applied.

Figure 7:
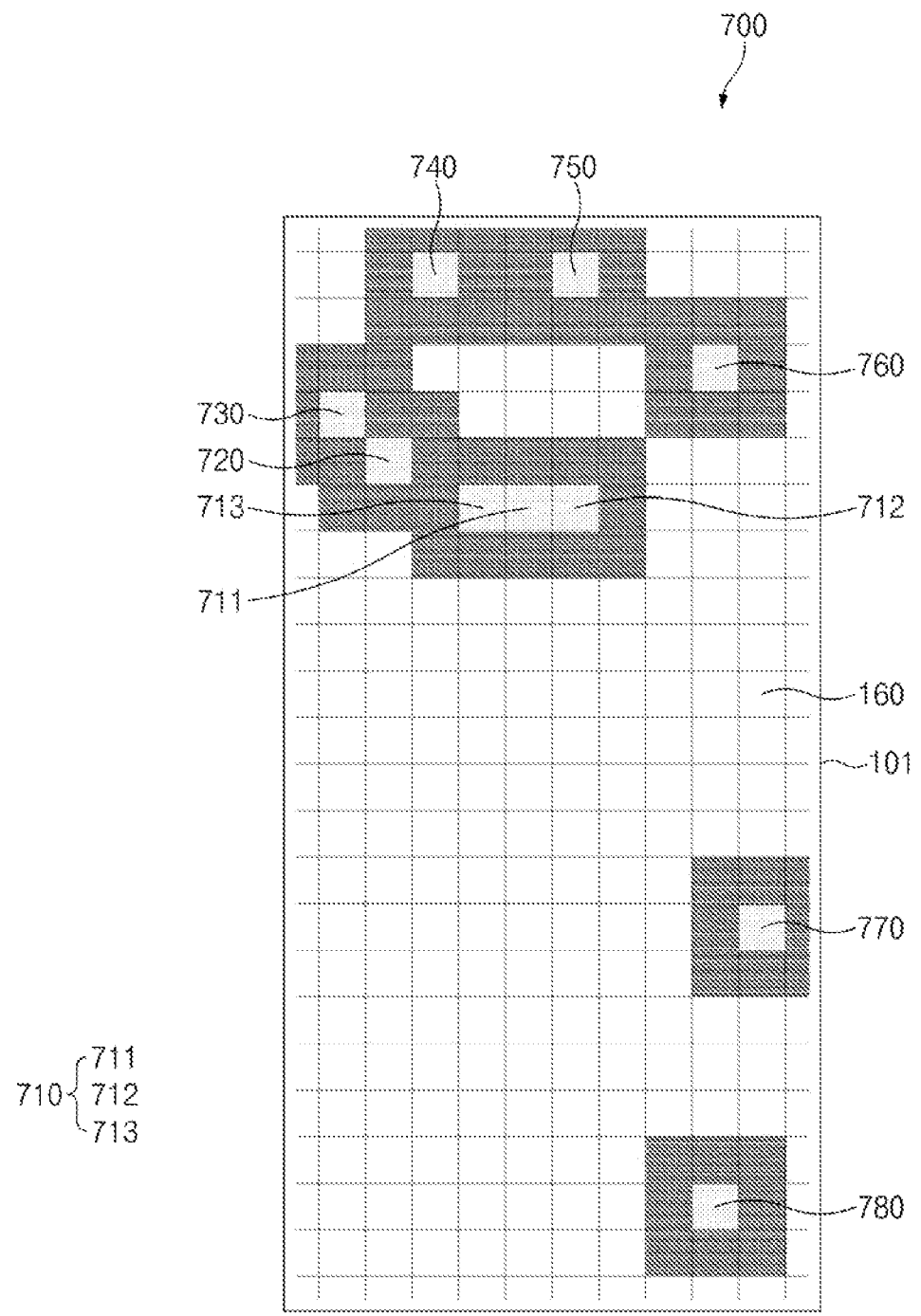
FIG. 7 is a drawing illustrating locations of heat sources on a heat map according to an embodiment.

FIG. 7 is a drawing 700 illustrating locations of heat sources on a heat map according to an embodiment.

In an embodiment, a surface temperature on the heat map may be analyzed to identify locations of heat sources, for example heat source 710, heat source 720, heat source 730, heat source 740, heat source 750, heat source 760, heat source 770, and heat source 780. The heat sources 710, 720, 730, 740, 750, 760, 770, and 780 and portions around the heat sources 710, 720, 730, 740, 750, 760, 770, and 780 may increase in temperature. The heat sources 710, 720, 730, 740, 750, 760, 770, and 780 may be controlled to reduce heat emitted from the heat sources 710, 720, 730, 740, 750, 760, 770, and 780 to reduce temperature.

In an embodiment, the heat sources 710, 720, 730, 740, 750, 760, 770, and 780 may be located in various portions of an electronic device (e.g., an electronic device 101 of FIG. 1). Only a heat source which has a heating control entry temperature or more among the heat sources 710, 720, 730, 740, 750, 760, 770, and 780 may be selectively entered in a heating control mode.

In an embodiment, adjacent modules 711, 712, and 713 may be viewed as one heat source 710. When the temperature of the heat source 710 enters the heating control entry mode or more and when the adjacent modules 711, 712, and 713 operate, the adjacent modules 711, 712, and 713 may enter the heating control mode. Thus, preventive control for the adjacent modules 711, 712, and 713 may be performed.

In an embodiment, a module limiting unit (e.g., a module limiting unit 225 of FIG. 2) may control a module based on information received from a temperature policy management unit 224 and a heating policy for each module. The module limiting unit 225 may control a central processing unit (CPU), a graphics processing unit (GPU), a communication processor (CP), WiFi (e.g., a communication circuit 213 of FIG. 2), a charger (e.g., a charging circuit 212 of FIG. 2), and/or a camera (e.g., a camera module 180 of FIG. 1).

In an embodiment, a main heat source, a temperature of which increases to the heating control entry temperature or more among the heat sources 710, 720, 730, 740, 750, 760, 770, and 780 (e.g., an application processor (AP), WiFi, and/or a 5G modem) may vary with a scenario in which the electronic device 101 is used. A portion with the highest temperature on the heat map may be represented near the main heat source.

In an embodiment, control for the module may include direct control for the heat sources 710, 720, 730, 740, 750, 760, 770, and 780 having a great influence on surface heating and preventive control for other modules which are influenced by heat diffused from the heat sources 710, 720, 730, 740, 750, 760, 770, and 780 to sharply increase in temperature.

In an embodiment, the module limiting unit 225 may determine a module, which is disposed in a portion with a temperature which is greater than or equal to the heating control entry temperature on the surface of the electronic device 101, as a heat source, direct control of which is required. The module limiting unit 225 may determine a module, which is disposed adjacent to the portion with the temperature which is greater than or equal to the heating control entry temperature, as an adjacent module.

In an embodiment, the module limiting unit 225 may control the heat source in a heating control mode. The module limiting unit 225 may control the remaining modules except for the heat source in a normal mode. For example, when the electronic device 101 uploads data using WiFi, a WiFi module may most rapidly increase in temperature. A portion at which the WiFi module is located on the surface of the electronic device 101 may most rapidly increase in temperature. When a temperature around WiFi reaches the heating control entry temperature, as it is determined that heating management is required, the WiFi module may be controlled in the same manner as a manner which limits a throughput. At this time, because a temperature around an application processor and/or a 5G modem does not still reach the heating control entry temperature, the application processor and/or the 5G modem may be controlled to continuously operate at maximum performance without limiting the performance of the application processor and/or the 5G modem.

In an embodiment, when a surface temperature around the adjacent module is higher than a temperature of the remaining portion due to heating of the adjacent module with respect to the adjacent module and when the adjacent module is expected to increase to a temperature which is greater than or equal to the heating control entry temperature due to a temperature which is diffused from the heat source to reach the adjacent module, the module limiting unit 225 may apply preventive control.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other feature (e.g., importance or order). It is to be understood that when an element (e.g., a first element) is referred to, with or without the term "operatively" or "communicatively", as "coupled with," "coupled to," "connected with," or "connected to" another element (e.g., a second element), this may mean that the element may be coupled with the other element directly (e.g., using a wired connection), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" may mean that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

In various embodiments, each component (e.g., a module or a program) of the above-described components may include a single entity or multiple entities, and some of the multiple entities may be separately disposed in different components. In various embodiments, one or more of the above-described components may be omitted, or one or more other components may be added. In alternative or additional embodiments, a plurality of components (e.g., modules or programs) may be integrated into a single component. In such a case, in various embodiments, the integrated component may still perform one or more functions of each of the plurality of components in the same or similar manner as they are performed by a corresponding one of the plurality of components before the integration. In various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
at least one sensor;
a communication circuit;
memory; and
at least one processor operationally connected with the at least one sensor, the communication circuit, and the memory,
wherein instructions, when executed by the at least one processor, cause the electronic device to:
identify an internal temperature of the electronic device using the at least one sensor;
provide, to an external device, internal temperature data associated with the internal temperature of the electronic device;
receive a surface temperature prediction model for predicting a surface temperature of the electronic device from the external device;
predict the surface temperature of the electronic device, the predicted surface temperature being represented two-dimensionally based on the surface temperature prediction model and the internal temperature of the electronic device;
generate a heat map based on the predicted surface temperature; and
select at least one heat source to enter heating control from among a plurality of modules of the electronic device based on the heat map.

2. The electronic device of claim 1, wherein the instructions, when executed by the at least one processor, cause the electronic device to:
analyze the heat map based on information associated with a module location; and
collect information associated with heat diffusion on a surface of the electronic device based on the analyzing of the heat map.

3. The electronic device of claim 2, wherein the instructions, when executed by the at least one processor, cause the electronic device to:
generate a limitation policy for limiting operation performance of the electronic device based on the analyzing of the heat map and a temperature policy.

4. The electronic device of claim 1, wherein the instructions, when executed by the at least one processor, cause the electronic device to:
select a module disposed in a portion of the electronic device at which the predicted surface temperature is greater than or equal to a heating control entry temperature as the at least one heat source to enter the heating control.

5. The electronic device of claim 1, wherein the instructions, when executed by the at least one processor, cause the electronic device to:
identify a module disposed adjacent to a heated portion as an adjacent module based on information associated with a module location.

6. The electronic device of claim 5, wherein the instructions, when executed by the at least one processor, cause the electronic device to:
control the adjacent module, based on the adjacent module increasing in temperature and being influenced by the at least one heat source.

7. The electronic device of claim 1, wherein the instructions, when executed by the at least one processor, cause the electronic device to:
receive a result of scaling and analyzing the surface temperature from the external device or a server, and select the at least one heat source based on the result.

8. A method for controlling an electronic device, the method comprising:
identifying an internal temperature of the electronic device using at least one sensor;
providing, to an external device, internal temperature data associated with the internal temperature of the electronic device;
receiving a surface temperature prediction model for predicting a surface temperature of the electronic device from the external device;
predicting the surface temperature of the electronic device, the predicted surface temperature being represented two-dimensionally based on the surface temperature prediction model and the internal temperature of the electronic device;
generating a heat map based on the predicted surface temperature; and
selecting at least one heat source to enter heating control from among a plurality of modules of the electronic device based on the heat map.

9. The method of claim 8, wherein the predicting of the surface temperature further comprises:
analyzing the heat map based on information associated with a module location; and
collecting information associated with heat diffusion on a surface of the electronic device based on the analyzing of the heat map.

10. The method of claim 9, wherein the predicting of the surface temperature further comprises:
generating a limitation policy for limiting operation performance of the electronic device based on the analyzing of the heat map and a temperature policy.

11. The method of claim 8, wherein the selecting of the at least one heat source comprises:
selecting a module disposed in a portion of the electronic device at which the predicted surface temperature is greater than or equal to a heating control entry temperature as the at least one heat source to enter the heating control.

12. The method of claim 8, wherein the predicting of the surface temperature comprises:
identifying a module disposed adjacent to a heated portion as an adjacent module based on information associated with a module location.

13. The method of claim 12, wherein the selecting of the at least one heat source comprises:

controlling the adjacent module, when the adjacent module increases in temperature and is influenced by the at least one heat source.

14. A non-transitory computer-readable storage medium configured to store instructions which, when executed by at least one processor, cause the at least one processor to:
identify an internal temperature of an electronic device using at least one sensor;
provide, to an external device, internal temperature data associated with the internal temperature of the electronic device;
receive a surface temperature prediction model for predicting a surface temperature of the electronic device from the external device;
predict the surface temperature of the electronic device, the predicted surface temperature being represented two-dimensionally based on the surface temperature prediction model and the internal temperature of the electronic device;
generate a heat map based on the predicted surface temperature; and
select at least one heat source to enter heating control from among a plurality of modules of the electronic device based on the heat map.

15. The non-transitory computer-readable storage medium of claim 14, wherein to predict the surface temperature, the instructions further cause the at least one processor to:
analyze the heat map based on information associated with a module location; and
collect information associated with heat diffusion on a surface of the electronic device based on the analyzing of the heat map.

16. The non-transitory computer-readable storage medium of claim 15, wherein to predict the surface temperature, the instructions further cause the at least one processor to:
generate a limitation policy for limiting operation performance of the electronic device based on the analyzing of the heat map and a temperature policy.

17. The non-transitory computer-readable storage medium of claim 14, wherein to select the at least one heat source, the instructions further cause the at least one processor to:
select a module disposed in a portion of the electronic device at which the predicted surface temperature is greater than or equal to a heating control entry temperature as the at least one heat source to enter the heating control.

* * * * *